Sept. 23, 1930.   E. UHER, JR   1,776,527
MACHINE FOR COMPOSING PHOTOGRAPHIC PRINTS
Filed Feb. 4, 1927
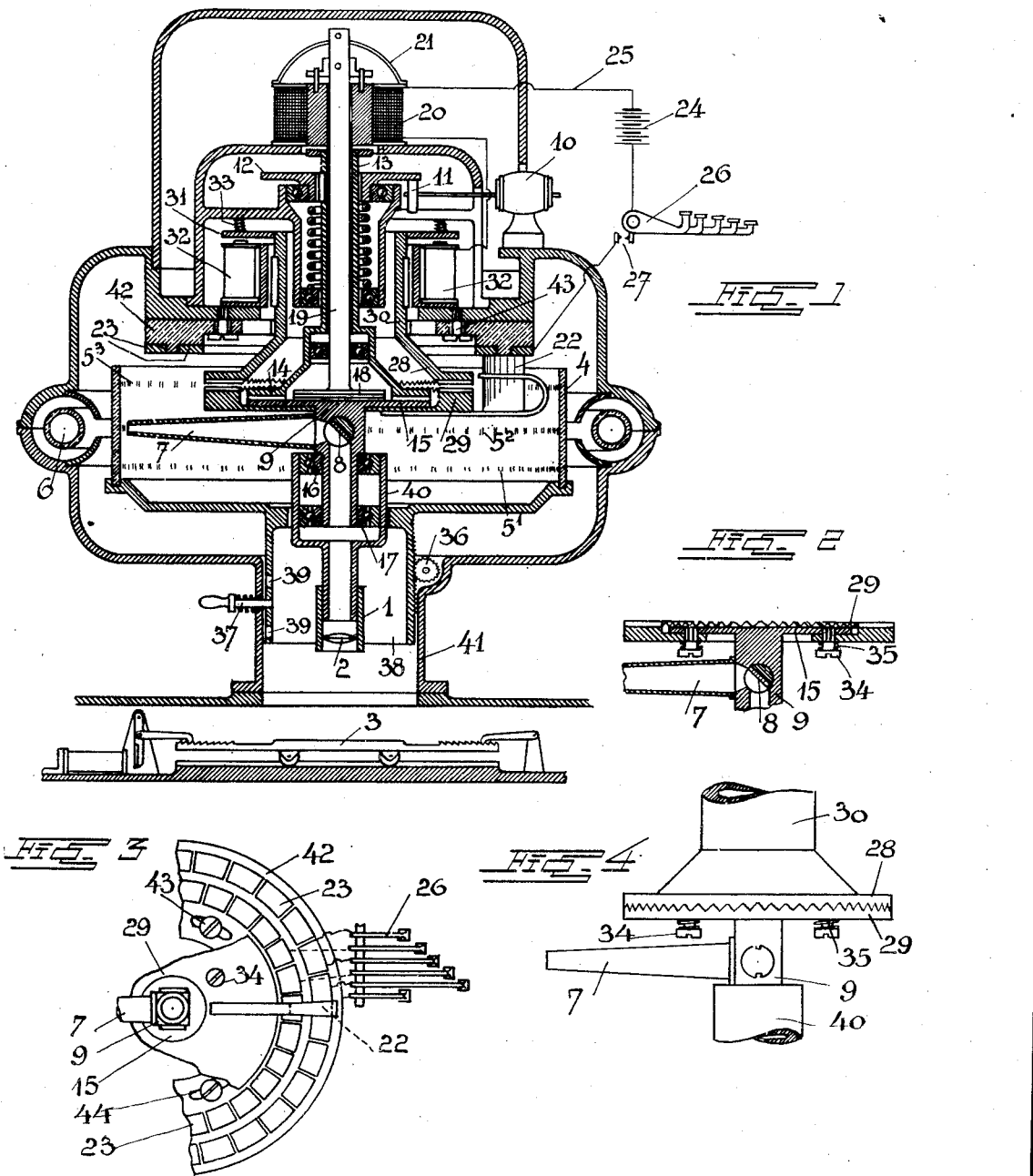

Patented Sept. 23, 1930

1,776,527

UNITED STATES PATENT OFFICE

EDMUND UHER, JR., OF BUDAPEST, HUNGARY, ASSIGNOR TO UHERTYPE A. G., OF GLARUS, SWITZERLAND, A FIRM OF SWITZERLAND

MACHINE FOR COMPOSING PHOTOGRAPHIC PRINTS

Application filed February 4, 1927, Serial No. 165,995, and in Hungary March 9, 1926.

This invention concerns a machine for composing photographic prints and a photographic method of producing therefor the printed characters to be exposed. The invention resides in a novel combination of optical and mechanical parts in the machine whereby it is possible not only to compose the prints in a highly efficient manner but also to produce the matrices under optical conditions exactly the same as those in which they are later photographed.

An embodiment of the invention is illustrated, diagrammatically and by way of example, in the accompanying drawings in association with an arrestment device which forms the subject of my Patent No. 1,718,615 dated June 25, 1929. Fig. 1 is a vertical cross section through the machine together with its slide which is disposed below it. Fig. 2 is a similar view of the mirror showing one half of an axially resilient claw-coupling. Fig. 3 is a plan view from below of a part of the ring of arresting contacts and Fig. 4 is a detail view of the claw-coupling in the engaged position.

An objective lens 2 mounted in a telescopic tube 1 is directed upon the composing surface 3 upon which the light-sensitive plate is exposed. The exposure area is stationary and the composing surface rests on a slide which is fed forward character by character and line by line. Further description of the construction of the slide is irrelevant to the present invention.

The matrices are arranged in rings $5^1$, $5^2$, $5^3$ around the interior of a glass drum 4 and are illuminated by an annular lamp 6. The pencil of light rays from a printed character passes by way of a small tube 7 onto the inclined mirror 8 which projects it through the objective 2 onto the composing surface 3. The drum 4 is co-axial with the pencil of rays reflected from the inclined mirror 8 so that it is merely necessary to rotate the mirror 8 together with the tube 7 and casing 9 in order to locate any particular character on the circumference of a ring, say $5^2$, and project the same onto the composing surface 3.

According to the present invention the optical axis of the path along which the light is projected from the matrices in the ring $5^2$ to the composing surface 3 is interrupted by a device, which in the example illustrated is an inclined mirror but might equally well be a prism, which is so arranged that its optical distance firstly from the matrix and secondly from the composing surface is always constant. The said device, or its entry-pupil, moreover, is arranged to be rotatable around the path of the light reflected therefrom towards the composing surface.

To prevent distortion the optical axis of the path of projection of the light is preferably deflected through 90° from a straight line. The deflection is certainly attended by a slight optical sacrifice but on the other hand a number of advantages are obtained. Thus for example to adjust to any particular character it is only necessary to move a simple periscope tube, the support for the characters remaining stationary. The previous, mechanically unreliable machine-components made of film are entirely obviated.

The described arrangement of the device for interrupting the light offers the advantage that the conditions for the adjustment to a particular character are always the same while its mechanical assembly is simple. A continuous drive, for example a friction device, is provided and is controlled by selective devices and an arresting mechanism which effect the location of and adjustment to the selected character, this being performed, in the example illustrated, as follows.

A small electric motor 10 drives, through a gear 11, a friction disc 12 which is keyed to a sleeve 13 in such a manner as to allow the latter to move longitudinally relatively thereto. The said sleeve terminates in a ring 14 which is adapted to co-operate with a friction disc 15 connected to the mirror casing 9. The motor 10 thus ultimately drives continuously the casing 9 together with the mirror 8 and tube 7, these members running on ball bearings 16, 17. To arrest the mirror 8 a braking disc 18 is employed which is actuated through the shaft 19 by the electromagnet 20 and leaf spring 21. Fig. 1 illustrates the braking disc in the lifted position, in which it allows the casing to rotate freely. Immediately the magnet 20 is excited however it draws the shaft 19 downwardly and brakes the disc 15. First of all, however, the said magnet draws the sleeve 13 upwardly so that the drive of the disc 15 is discontinued before the braking thereof is effected.

The following provision is made to ensure the disc 15 and tube 7 being arrested precisely in the desired position.

The disc 15 supports a brush 22 which runs on contacts 23 (Fig. 3) embedded in an insulating ring 42. A separate contact 23 is provided for each character on the circumference of the ring 2. The exciting current is carried from a battery 24 by way of a conductor 25 directly to the magnets 20 and thence by way of the metal of the machine to the brush 22. The circuit through any contact 23 is completed by separate branch leads each of which has an interruption 27 controlled by a key 26. It is only necessary to press down the selected key 26 and the magnet 20 will, immediately the rotating brush 22 registers with the corresponding contact 23, be excited and the ring 14 momentarily raised while the braking disc 18 is lowered.

A claw-coupling 28, 29, which has as many teeth as there are characters on the circumference $5^2$ or contacts 23 in the ring of contacts, is provided for the fine adjustment on the stopping of the tube 7. The upper half 28 of the coupling is carried by the lower end of a sleeve 30 which is controlled by electromagnets 32 and springs 33 which act on a disc 31. The magnets 32 are connected in series with the magnets 20 so that the arrestment of the disc 15 is followed by the engagement of the claw-coupling 28, 29. The lower half 29 of the coupling is connected with the disc 15 by screws 34 and springs 35, the connection being somewhat resilient in the axial direction so that harmful shocks on the engagement of the coupling are avoided. Screws 43 in the insulating ring 42 project into circular grooves 44 which enable the ring of contacts to be adjusted.

The drum 4 carries the rings $5^1$, $5^2$, $5^3$ of characters one above the other and may be adjusted axially by means of a gear 36, a spring loaded pin 37 and holes 39 provided in the tubular drum-extension 38. Each ring contains different groups of characters which are adjusted to the level of the tube 7 at will, at the commencement of a period of continuous operation.

As the drawing shows, the drum extension 38, the mirror casing 9, the intermediate tube 40 and finally the tubular casing extension 41 project into one another in a telescopic manner. Parts in optical co-operation may therefore be assembled concentrically by suitable rotation.

The manner of operation of the described machine is as follows:

The selected ring $5^1$, $5^2$ or $5^3$ of characters is adjusted to the level of the tube 7 and the photographic composing is performed, together with the movement of the slide 3, in a manner similar to type-writing, the exposure period also being controlled from the keys 26. The sleeves 13 and 30 are, similarly to the shaft 19, spring loaded so that they spring back into their positions of rest when the magnets are unexcited. The entry of light from outside is prevented in a manner per se known.

The matrices may, according to the invention, be produced by placing the original representations of the characters separately in the exposure area for the composing surface 3 and photographing them there one by one on the inside, previously rendered light-sensitive, of the drum 4 with the aid of the objective lens 2, the mirror 8 and tube 7. Thus the machine is capable of providing its own matrices and furthermore of providing that of each character in its correct position.

What I claim is:—

1. A device of the character described, comprising in combination, a light source, means for focussing the rays of light from said source, means for supporting a sensitized surface in a plane parallel with the axis of said focussing means, and means in the path of projection of said light rays for deflecting the same on to said sensitized surface, said deflecting means being mounted for continuous rotation about the axis of the light directed on the sensitized surface.

2. A device of the character described, comprising in combination, a light source, means for focussing the rays of light from said source, means for supporting a sensitized surface in a plane parallel with the axis of said focussing means, and means in the path of projection of said light rays for deflecting the same on to said sensitized surface, the pupil of incidence of said deflecting means being mounted for continuous rotation about the axis of the light directed on the sensitized surface.

3. A device of the character described, comprising in combination, a light source, means for focussing the rays of light from said source, means for supporting a sensitized surface in a plane parallel with the axis of said focussing means, means in the path of projection of said light rays for deflecting the same on to said sensitized surface, said deflecting means being mounted for rotation about the axis of the light directed on the sensitized surface, means for continuously rotating said deflecting means, and means for selectively stopping said rotation at any one of a plurality of predetermined points.

4. A device of the character described, comprising in combination, a light source, means for focussing the rays of light from said source, means for supporting a sensitized surface in a plane parallel with the axis of said focussing means, means in the path of projection of said light rays for deflecting the same on to said sensitized surface, said deflecting means being mounted for rotation about the axis of the light directed on the sensitized surface, means for continuously rotating said deflecting means, means for selectively stopping said rotation at any one of a plurality of predetermined points, and means operative upon the actuation of said stopping means for preventing rotation of said deflecting means.

5. A device of the character described, comprising in combination, a light source, means for focussing the rays of light from said source, means for supporting a sensitized surface in a plane parallel with the axis of said focussing means, means in the path of projection of said light rays for deflecting the same on to said sensitized surface, said deflecting means being mounted for rotation about the axis of the light directed on the sensitized surface, and a transparent drum disposed in concentric relation with said deflecting means, said drum bearing characters disposed in the path of the rays of light from said source.

6. A device of the character described, comprising in combination, a light source, means for focussing the rays of light from said source, means for supporting a sensitized surface in a plane parallel with the axis of said focussing means, means in the path of projection of said light rays for deflecting the same on to said sensitized surface, said deflecting means being mounted for rotation about the axis of the light directed on the sensitized surface, and a transparent drum disposed in concentric relation with said deflecting means, said drum bearing a plurality of groups of characters and being movable to carry either of said groups into the path of the rays of light from said source.

7. A device of the character described, comprising in combination, a light source, means for focussing the rays of light from said source, means for supporting a sensitized surface in a plane parallel with the axis of said focussing means, means in the path of projection of said light rays for deflecting the same on to said sensitized surface, said deflecting means being mounted for rotation about the axis of the light directed on the sensitized surface, a lens disposed between said deflecting means and said sensitized surface, said drum, deflecting means and lens being disposed in coaxial relation and mounted for telescopic movement relatively to each other and said drum bearing characters disposed in the path of the rays of light from said source.

In testimony whereof I hereunto affix my signature this 13 day of January, 1927.
EDMUND UHER, JR.